United States Patent [19]
Wallis

[11] 3,732,801
[45] May 15, 1973

[54] VEHICLE PASSENGER COMPARTMENT PRESSURE RELIEF SYSTEM

[75] Inventor: Stanley B. Wallis, Ypsilanti, Mich.

[73] Assignee: Ford Motor Company, Dearborn, Mich.

[22] Filed: July 19, 1971

[21] Appl. No.: 163,860

[52] U.S. Cl. .................98/2.05, 98/2.16, 98/2.18
[51] Int. Cl. ..............................B60h 1/24
[58] Field of Search................98/2.00, 2.05, 2.06, 98/2.07, 2.08, 2.09, 2.16, 2.17

[56] References Cited

UNITED STATES PATENTS

| 2,800,285 | 7/1957 | Muller | 98/2.07 |
| 2,832,277 | 4/1958 | Simons | 98/2.06 |
| 2,852,997 | 9/1958 | Leslie | 98/2.17 |
| 2,864,299 | 12/1958 | Betts | 98/2.17 |
| 3,103,867 | 9/1963 | Hlerta | 98/2.18 |

*Primary Examiner*—Meyer Perlin
*Attorney*—Keith L. Zerschling

[57] ABSTRACT

A vehicle passenger compartment pressure relief system comprising a valve controlled discharge outlet in a body panel through which air may be exhausted to the atmosphere. The opened or closed position of the valve is correlated with the position of a control lever operable to regulate the heat output of the vehicle heating unit. The control lever is movable between cool and warm positions with the exhaust valve correspondingly being wholly opened in a full cool position and wholly closed in a full warm position of the control lever.

2 Claims, 3 Drawing Figures

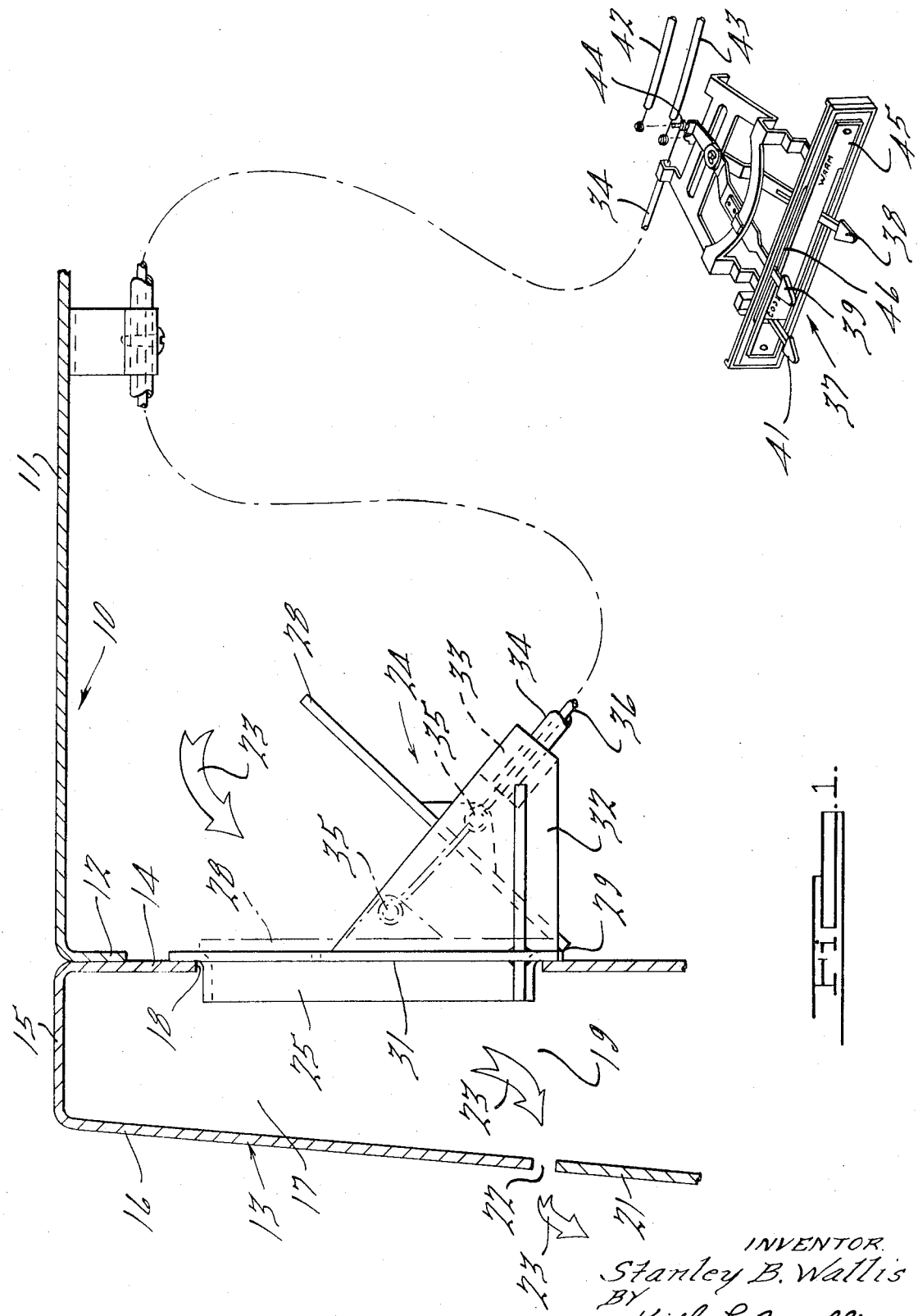

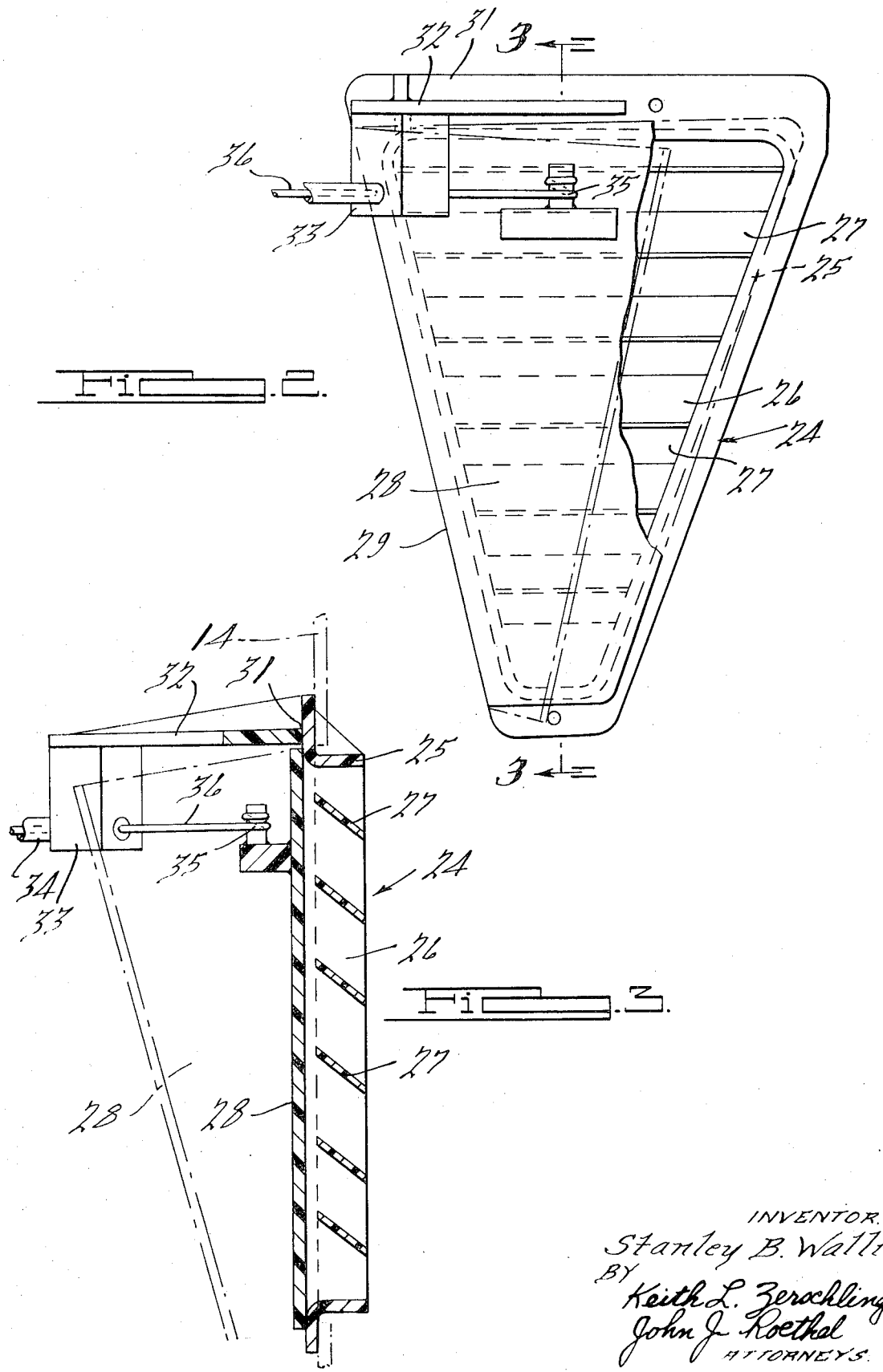

3,732,801

VEHICLE PASSENGER COMPARTMENT PRESSURE RELIEF SYSTEM

BACKGROUND OF THE INVENTION

Provision is made in most conventional vehicle air conditioning, heating and ventilating systems for the exhaust to atmosphere of a part of the passenger compartment air. This may be accomplished by a pressure relief valve or vent placed in a body panel, such as is disclosed in U.S. Pat. No. 3,259,051, issued July 5, 1966 to H. Boche et al. The pressure relief valve or vent is located on a surface of the vehicle body over which the air flow, as the vehicle moves along the roadway, is adapted to create a negative pressure. The vent may comprise open louvers, as in the Boche et al. patent, or louvers provided with resilient flaps to protect against backflow into the vehicle if the vent is temporarily placed under positive pressure. The latter arrangement is disclosed in U.S. Pat. No. 3,405,968, issued to N. Feles et al. on Oct. 15, 1968.

Although maximum air exhaust through the pressure relief valve or vent is desired under cooling or ventilating conditions, such maximum air exhaust under heat required conditions results in a maximum heat loss which is undesirable.

Accordingly, it is an object of the present invention to provide a simple construction and arrangement for correlating the air exhaust flow through a pressure relief valve or vent with the degree of heat required in the vehicle passenger compartment.

SUMMARY OF THE INVENTION

The vehicle passenger compartment pressure relief system embodying the present invention comprises a discharge outlet in a vehicle body panel. A valve means is supported on the body panel contiguous the discharge outlet for opening and closing the latter. A control lever, usually supported on the instrument panel, is movable between cool and warm positions and is adapted to be coupled to a temperature control element for a vehicle heater unit. A movement transmitting means, such as a flexible cable, couples the valve means to the control lever. The relationship of the control lever to the valve means through the movement transmitting means is such that the valve means is movable from opened to closed position in response to movement of the control lever from cool to warm position, and vice versa.

DESCRIPTION OF THE DRAWING

Further features and advantages of the present invention will be made more apparent as this description proceeds, reference being had to the accompanying drawings, wherein:

FIG. 1 is a view in part perspective and in part sectional disclosing a pressure relief or air exhaust valve coupled to an air conditioning or heating unit control;

FIG. 2 is a side view of the air exhaust valve; and

FIG. 3 is a view on the line 3—3 of FIG. 2.

DETAILED DESCRIPTION OF THE INVENTION

Referring now to the drawing and particularly to FIG. 1, there is diagrammatically shown a horizontal section through a corner of a vehicle body passenger compartment, generally designated 10. The corner structure comprises a dash panel 11 having a rearwardly turned flange 12. Welded to the flange 12 is a structural member 13 having a rearwardly extending inner side panel portion 14, a front panel portion 15 and an outer side panel 16 which may be part of the outer skin or panel of the vehicle body. The structural member 13 forms a cavity or door hinge chamber 17 (the door hinges not being shown) and this chamber is in communication with the vehicle passenger compartment through a large aperture 18.

The cavity or chamber 17 is closed at its rear end 19 by the vehicle door, only a portion of the outer panel 21 of the door being shown. There is a gap 22 between the leading edge of the door panel 21 and the trailing edge of the structural member panel 16. As indicated by the arrows 23, the vehicle passenger compartment is in communication with the atmosphere outside the vehicle through the aperture 18, the cavity 17 and the gap 22. As is well known, air flow over the outer surface of the vehicle body panel 16 and the door panel 21 creates a negative pressure across the body gap 22 inducing discharge of passenger compartment air to the atmosphere. Reference is made to this phenomenon in U.S. Pat. No. 3,405,968, cited above.

Following the disclosure of U.S. Pat. No. 3,405,968, the aperture would be fitted with a grille and one way valves or flaps to prevent back flow of air or dust from outside the vehicle into the passenger compartment when the vehicle is at a stand still. It has been found that such an arrangement is satisfactory when the vehicle air conditioning or ventilation system is being operated in a cooling or ventilating mode. In this mode, maximum air exhaust is a desirable condition. When the vehicle system is being operated in a heating mode, however, such an arrangement permits an excessive heat loss.

Accordingly, the present invention embodies a pressure relief valve, generally designated 24, controlling the flow of air through the aperture 18.

The relief valve 24 may be a molded polypropylene plastic unit comprising a flanged body portion 25. As best seen in FIG. 3, the body portion 25 is substantially triangular and it will be understood that the panel aperture 18 will be complementary to receive the valve body portion. The opening 26 in the body portion 25 is louvered as at 27. The valve flap for door 28 is integrally hinged at one edge 29 to the body portion. At an edge 31 at right angle to the hinged edge 29, the body portion has an upstanding leg 32 providing a support for an anchor 33 for one end of a Bowden cable 34. The movable wire 36 of the cable 34 is coupled at 35 to the valve door 28.

The Bowden cable runs from the valve door 28 to an air conditioner or heater control unit, generally designated 37. The control unit 37 has at least two Bowden cables actuating levers 38 and 39, respectively, and a switch lever 41. For example, actuating lever 38 may be coupled to a functional control cable 42, i.e., a cable that controls dampers determining the air flow distribution through flow outlets, instrument panel outlets, or windshield defroster outlets, or any combination of these. The switch lever 41 controls blower speed. The actuating or control lever 39 is coupled to a temperature control cable 43 to modulate the hot and cold air inputs into the plenum chamber to give the desired output temperature through the air conditioning or heating unit outlets.

In carrying out the present invention, the Bowden cable 34 coupled to the valve door 28 is operatively connected to the end 44 of the control lever 39 in conjunction with the temperature control cable 43. Thus, any time the control lever 39 is moved to modulate the output temperature of the air conditioning or heating unit, a correlated movement of the damper connection of the valve door 28 will take place. It will be noted that the instrument panel plate 45 through which the lever 38, 39 and 41 project has a slot 46 through which the control lever 39 projects. At the left end of the slot 46, the plate 45 is marked with the symbol "COOL" and the right end with the symbol "WARM." As shown in FIG. 1, when the control lever 39 is at the extreme "cool" end of the slot 46, the valve door 28 is in a full opened position. As the control lever 39 is moved from left to right toward the "warm" end of the slot 46, the wire 36 of the Bowden cable 34 is moved in a direction to swing the valve door 28 in a counterclockwise direction about its hinged edge 29 toward a closed position. If the control lever is moved to the extreme right end of slot 46 over the "warm" symbol, the valve door 28 will achieve the fully closed position shown in dot-dash outline in FIG. 1.

With the foregoing construction and arrangement, anytime the control lever 39 is at the maximum "warm" end of the operating range no passenger compartment air and, therefore, no heat will escape through the exhaust or pressure relief valve. As the vehicle passenger compartment begins to warm up, the natural action of the vehicle operator will be to moderate the temperature by moving the control lever 39 toward the "cool" end of slot 46. The valve door 28 will then be partially opened permitting moderate escape of exhaust air from the passenger compartment. During cooling or ventilating modes of operation, the control lever will in most cases be at the extreme "cool" end of the slot 46. In this condition, the valve door 28 is fully opened permitting maximum flow through of air to the passenger compartment and then out through the pressure relief valve.

It is to be understood that the invention is not limited to the exact construction illustrated and described above, but that various changes and modifications may be made without departing from the spirit and scope of the invention as defined by the following claims.

I claim:

1. A pressure relief system for a vehicle passenger compartment heated by a forced air heater unit having a temperature control means for varying the heat input to the air flowing through the heater unit, the pressure relief system comprising:
   an air discharge outlet in a wall of the passenger compartment,
   a valve means contiguous the discharge outlet for varying the air flow through the outlet between a minimum and a maximum flow,
   a control lever coupled to the temperature control means of the forced air heater unit,
   the control lever being movable between two positions corresponding to minimum and maximum heat input into the passenger compartment,
   and movement transmitting means coupling the control lever to the valve means,
   the coupled relationship of the control lever to the valve means such that movement of the control lever from a position of minimum to a position of maximum heat input into the passenger compartment results in inverse movement of the valve means from a position permitting maximum to a position permitting minimum air flow from the vehicle passenger compartment, and vice versa.

2. A vehicle passenger compartment pressure relief system, comprising:
   an air discharge outlet in a wall of the passenger compartment,
   a valve means contiguous the discharge outlet for varying the air flow through the outlet between a minimum and a maximum flow,
   the valve means being a flap valve hinged at one edge to a louvered valve body portion fitted in the outlet in the body panel,
   the flap valve and valve body portion being integrally formed of plastic,
   a control lever means coupled to a temperature control member of a forced air heater unit,
   the control lever means being movable between two positions corresponding to minimum and maximum heat input into the passenger compartment,
   and movement transmitting means coupling the control lever means to the valve means,
   the coupled relationship of the control lever means to the valve means being such that movement of the control lever means from a position of minimum to a position of maximum heat input into the passenger compartment results in inverse movement of the valve means from a position of maximum to a position of minimum air flow from the vehicle passenger compartment, and vice versa.

* * * * *